Figure 4:
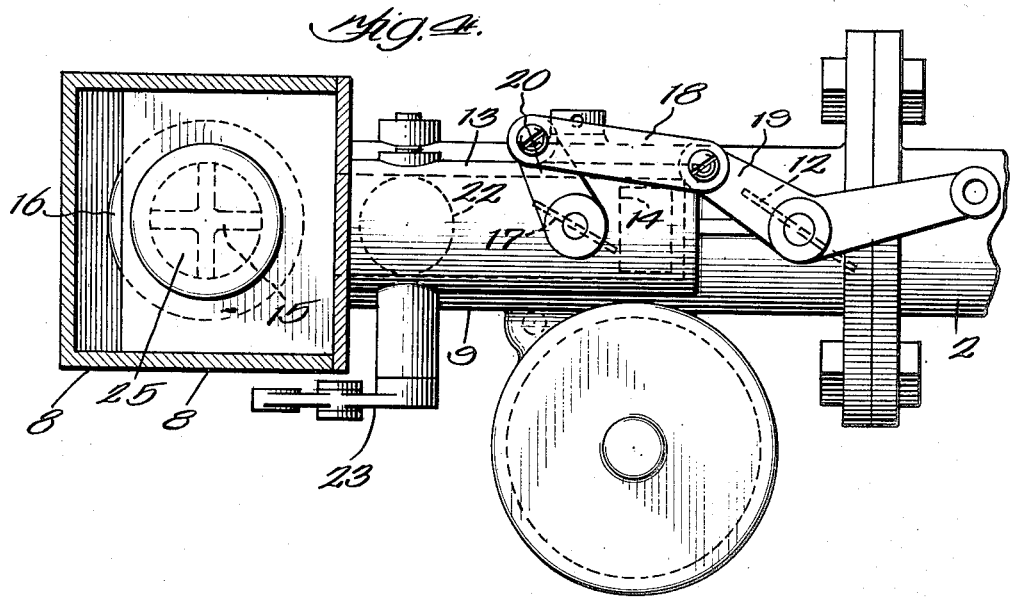

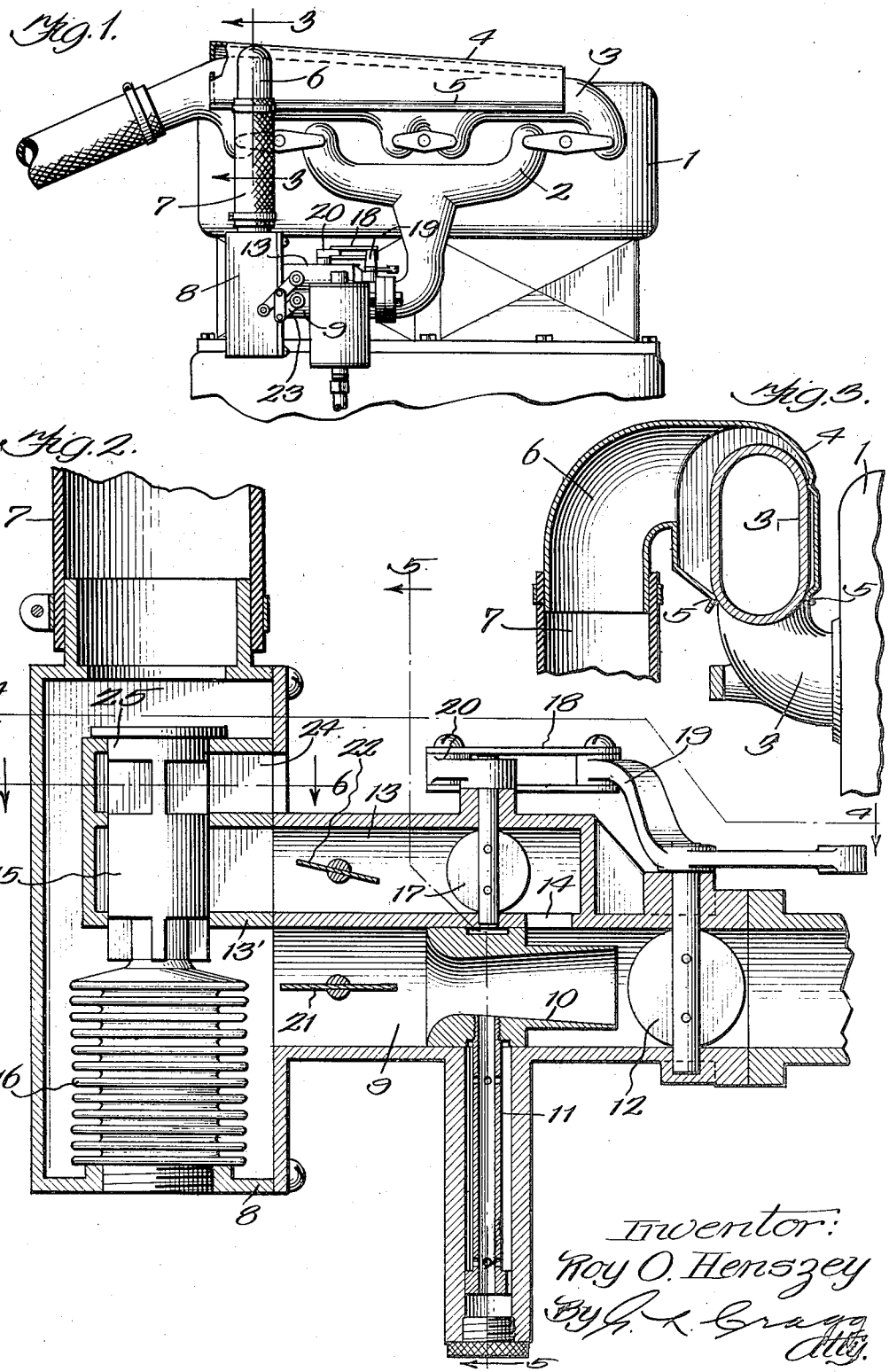

Nov. 20, 1923.　　　　R. O. HENSZEY　　　　1,474,968
CARBURETOR
Filed Sept. 25, 1922　　　2 Sheets-Sheet 2

Inventor:
Roy O. Henszey
By G. L. Cragg
Atty.

Patented Nov. 20, 1923.

1,474,968

UNITED STATES PATENT OFFICE.

ROY O. HENSZEY, OF OCONOMOWOC, WISCONSIN.

CARBURETOR.

Application filed September 25, 1922. Serial No. 590,297.

*To all whom it may concern:*

Be it known that I, ROY O. HENSZEY, citizen of the United States, residing at Oconomowoc, in the county of Waukesha and State of Wisconsin, have invented a certain new and useful Improvement in Carburetors, of which the following is a full, clear, concise, and exact description.

My invention relates to carburetors and the association thereof with internal combustion engines.

The carburetor of my invention has a main air inlet passage and a second or auxiliary air inlet passage which has communication with the first air inlet passage between the engine and the liquid fuel inlet and preferably between the engine throttle and the fuel inlet. There is a valve for controlling the flow of air into the second or auxiliary air inlet passage to permit the flow of air from this passage to the main air inlet passage when it is desired to "thin" the mixture, the amount of air flowing through the auxiliary air inlet passage being regulable by said valve. This valve is arranged so as not to be subject to the influence of engine suction so that the adjustment effected thereby will not be automatically disturbed due to such suction although the position of the valve is preferably automatically regulated by the temperature of the exhaust gases discharged from the engine.

My improved equipment desirably also includes a second throttle, this additional throttle being disposed in the auxiliary air inlet passage and being preferably coupled with the main throttle so that the two throttles will operate in unison. There is preferably also a valve at the admission end of the main air inlet passage and an additional valve at the admission end of the auxiliary air inlet passage, these valves being preferably coupled so as to operate in unison and so related that the auxiliary air inlet passage will be closed when the main air inlet passage is slightly opened whereby the mixture may be initially rich in starting the engine.

The first aforesaid valve, the one which is preferably controlled by the heat of the exhaust gases discharged from the engine, is preferably disposed in a valve chamber that also contains a thermostat which is in controlling relation to this valve and is itself subject to the heat of the exhaust gases.

In the preferred embodiment of the invention air which is to be carbureted is caused to flow through a conduit that is in communication with the valve chamber and which is located in proximity to the exhaust manifold or conduit of the engine so that the air flowing to the valve chamber for admission to the carburetor will be heated in order to regulate the action of the thermostat and to prepare the air for carburetion.

Figure 5:
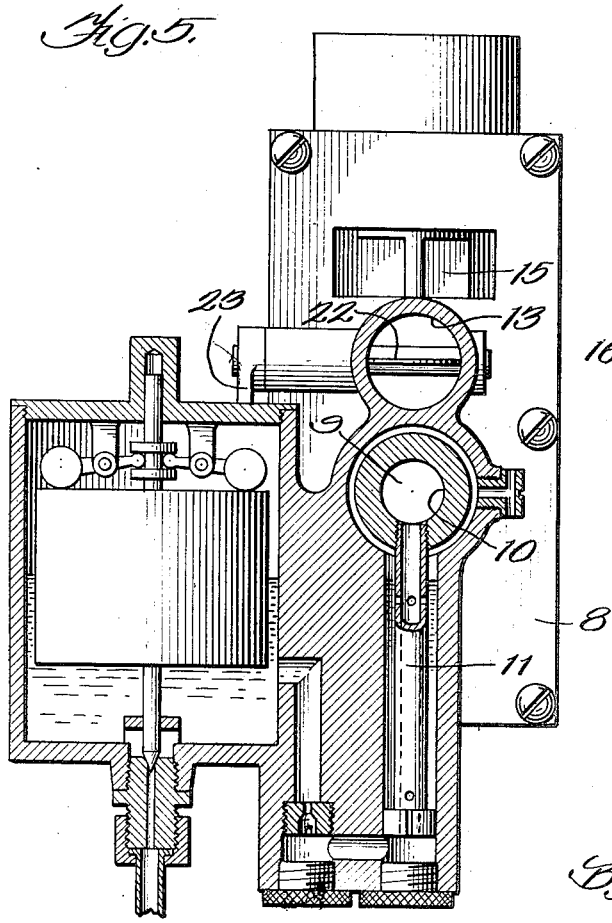
Figure 6:
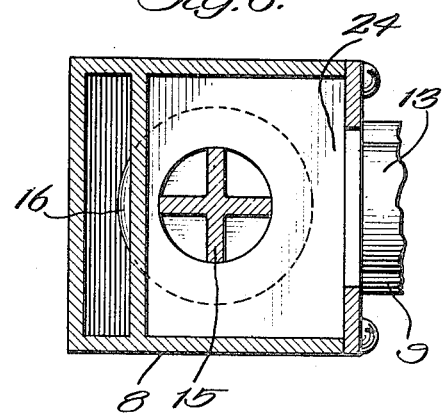

The invention has other characteristics and will be fully explained by reference to the accompanying drawings in which Fig. 1 is a side view illustrating the internal combustion engine and an air conduit located in proximity to the exhaust manifold thereof; Fig. 2 illustrates the improved carburetor, a portion of the air conduit that extends from the exhaust manifold, and a portion of the connection which intervenes between the carburetor and the engine; Fig. 3 is a sectional view on line 3—3 of Fig. 1; and Figs. 4, 5 and 6 are views respectively taken upon lines 4—4, 5—5 and 6—6 of Fig. 2.

Like parts are indicated by similar characters of reference throughout the different figures.

The internal combustion engine 1 illustrated is understood to have a number of cylinders, though the invention is not to be thus limited. The conduit 2 for admitting carbureted air to the engine is in the form of a manifold as is the conduit 3 for conveying away spent gases. A jacket 4, U-form in cross section, is formed with spring clip portions which engage the jacket with the exhaust manifold 3. This jacket is opened at one end thereof to permit air that is to be carbureted to pass therethrough, this air being heated in its passage along the manifold. A pipe portion 6 establishes communication between the interior of the jacket and a pipe 7 which, in turn, is in communication with the valve chamber 8. The carburetor has a main air inlet passage 9 that may receive heated air from the chamber. This passage contains the venturi 10 in which the discharge end of the liquid fuel inlet pipe 11 terminates. A main throttle 12 is also located in the main air inlet passage 9 between the liquid fuel inlet and the engine for regulating the amount of carbureted air that may be supplied to the engine. The second or auxiliary air inlet passage 13 is also adapted for communication with the valve chamber, there being an opening 14 that establishes communication between the two inlet air passages between the liquid fuel inlet and the engine and preferably between the liquid fuel inlet and the throttle 12. The passage 13 has a continuation 13' which extends into the valve chamber and in which a valve 15 is disposed to prevent or permit the passage of air through the second or auxiliary air inlet passage, this valve being opened when it is desired to "thin" the mixture, the opening of the valve varying according to the thinness of the mixture desired. The valve 15 is arranged to be without the influence of the engine suction to prevent this suction from impairing the adjustment which is imparted to the valve. The means for operating the valve 15 is desirably regulated by the temperature of the exhaust gases but the inventions not to be thus limited.

When the temperature of the exhaust gases is to control the operation of the valve a thermostat 16 is coupled with the valve. This thermostat is of the bellows type and is preferably located within the valve chamber in the path of the heated air flowing through the chamber to the carburetor. When the engine is cold the valve 15 is closed so that the mixture is then the richest. As the engine is brought into operation, the air that is being supplied to the carburetor becomes heated to cause the thermostat to expand to be followed by the opening of the valve 15 to an extent which corresponds with the temperature of the admitted air and the expansion of the thermostat due to such temperature. When the valve 15 is thus opened air is passed to the carburetor in two streams, one flowing through the main inlet air passage and the other flowing through the auxiliary inlet air passage. It is only the air which flows through the main inlet air passage which is carbureted, by the carburetor, the air flowing through the auxiliary air passage finding its way to the main air passage through the opening 14 and mixing with the air in the main air passage after the air in this latter passage has been carbureted whereby the richness of the mixture flowing to the engine is reduced to an extent which corresponds to the opening of the valve 15 and the degree of heat of the exhaust gases which regulates the opening of this valve. The volume of carbureted air flowing to the engine is regulated by the main throttle 12 and in order that the richness of the mixture may not be too greatly reduced when the throttle is moved in a closing direction, I also provide a throttle 17 in the auxiliary air passage to reduce the flow of uncarbureted air as the flow of carbureted air to the engine is reduced.

The two throttles are desirably coupled by the linkage 18 which connect the arms 19 and 20 respectively in fixed relation to said throttles, this arrangement permitting the throttle to be moved in unison.

Air valves 21 and 22 are respectively provided in the admission ends of the air inlet passages 9 and 13. These air valves are manually regulable independently of the throttles and are preferably coupled by the link structure 23 so that they may be operated in unison. These valves are so related that when the valve 22 in the auxiliary air passage is closed the valve 21 in the main air passage will be slightly opened so that the mixture may then be the richest for starting the engine. The structure illustrated also includes a third air inlet passage 24 which terminates at the valve chamber. When the heat of the air passing from the region of the engine to the valve chamber becomes increased sufficiently the opening of the passage 13 by the valve 15 is followed by the opening of the valve 25 that is formed in one integral structure with the valve 15. When the valve 25 is opened air is admitted through the passage 24 into the valve chamber to mingle with the air flowing from the region of the engine with results that will be understood by those skilled in the art.

In the preferred embodiment of the invention a surplus of heat is taken from the engine into the valve chamber 8 so that the air to be carbureted reaches the desired operating temperature very rapidly. When this temperature is reached the valve 25 is opened to admit cool air through the third air inlet passage 24 to prevent this temperature from being exceeded. The air to be carbureted is thus maintained at a predetermined fixed temperature which is determined in the calibration of the carburetor. The working parts of the equipment are so proportioned that at this predetermined fixed temperature the valve 15 that controls the second air inlet passage is fully opened. The second or auxiliary air inlet passage 13 is so proportioned with respect to the main inlet air passage 9 that when the predetermined fixed temperature is reached a predetermined desirable mixture is procured and when passage 13 is closed by the valve 15 at reduced temperatures passage 9 will enable the production of a mixture which will operate the engine at temperatures below the aforesaid predetermined temperature at which air is to be carbureted.

The advantages of my improved carburetor and the assembly thereof with an internal combustion engine will be readily understood from the drawings and the description thereof which I have given. Changes, however, may be made from the illustrated structure without departing from the spirit of the invention and I do not wish, there-inlet air passage and a liquid fuel inlet discharging into this passage; a throttle in said air inlet passage, the carburetor having a second air inlet passage that is in communication with the first between the liquid fuel inlet and the throttle; a second throttle, disposed in the second air inlet passage and coupled with the first throttle to be operable in unison therewith; a valve, uninfluenced by engine suction, that controls the passage of air into the second air inlet passage; a thermostat subject to the heat of the engine and serving, when responding to the heat, to open said valve; and coupled air valves in the admission ends of said air inlet passages to control the amount of air flowing therethrough.

7. The combination with an internal combustion engine; of a carburetor having one inlet air passage and a liquid fuel inlet discharging into this passage; a throttle in said air inlet passage, the carburetor having a second air inlet passage that is in communication with the first between the liquid fuel inlet and the throttle; a second throttle, disposed in the second air inlet passage and coupled with the first throttle to be operable in unison therewith; a valve, uninfluenced by engine suction, that controls the passage of air into the second air inlet passage; and a thermostat subject to the heat of the engine and serving, when responding to the heat, to open said valve.

8. The combination with an internal combustion engine; of a carburetor having one inlet air passage and a liquid fuel inlet discharging into this passage; a throttle in said air inlet passage, the carburetor having a second air inlet passage that is in communication with the first between the liquid fuel inlet and the throttle; a second throttle, disposed in the second air inlet passage and coupled with the first throttle to be operable in unison therewith; a valve, uninfluenced by engine suction, that controls the passage of air into the second air inlet passage; and means for operating said valve.

9. The combination with an internal combustion engine; of a carburetor having one inlet air passage and a liquid fuel inlet discharging into this passage; a throttle in said air inlet passage, the carburetor having a second air inlet passage that is in communication with the first between the liquid fuel inlet and the throttle; a valve, uninfluenced by engine suction, that controls the passage of air into the second air inlet passage; a thermostat subject to the heat of the engine and serving when responding to the heat to open said valve; and coupled air valves in the admission ends of said air inlet passages to control the amount of air flowing therethrough, and relatively disposed to enable the first air inlet passage to be slightly opened by its air valve while the second air inlet passage is substantially closed by its air valve.

10. The combination with an internal combustion engine; of a carburetor having one inlet air passage and a liquid fuel inlet discharging into said passage; a throttle in said air inlet passage, the carburetor having a second air inlet passage that is in communication with the first between the liquid inlet and the throttle; a valve, uninfluenced by engine suction, that controls the passage of air into the second air inlet passage; a thermostat subject to the heat of the engine and serving, when responding to the heat, to open said valve; and coupled air valves in the admission ends of said air inlet passages to control the amount of air flowing therethrough.

11. The combination with an internal combustion engine; of a carburetor having one inlet air passage and a liquid fuel inlet discharging into this passage; a throttle in said air inlet passage, the carburetor having a second air inlet passage that is in communication with the first between the liquid fuel inlet and the throttle; a valve, uninfluenced by engine suction, that controls the passage of air into the second air inlet passage; and a thermostat subject to the heat of the engine and serving, when responding to the heat, to open said valve.

12. The combination with an internal combustion engine; of a carburetor having one inlet air passage and a liquid fuel inlet discharging into this passage; the carburetor having a second air inlet passage that is in communication with the first; a valve that controls the passage of air into the second air inlet passage; and a thermostat subject to the heat of the engine and serving, when responding to the heat, to open said valve.

13. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; a thermostat subject to the heat of the engine and serving, when responding to the heat, to open said valve; and coupled air valves in the admission ends of said air inlet passages to control the amount of air flowing therethrough, and relatively disposed to enable the first air inlet passage to be slightly opened by its air valve while the second air inlet passage is substantially closed by its air valve.

14. The combination with an internal combustion engine; of a carburetor having one inlet air passage and a liquid fuel inlet fore, to be limited to the precise details of construction shown, but having thus described my invention I claim as new and desire to secure by Letters Patent the following:—

1. The combination with an internal combustion engine having intake and exhaust conduits; of a conduit for air that is to be carbureted and placed in proximity to the exhaust conduit to be heated thereby; a chamber in communication with the air conduit to receive heated air therefrom; a carburetor having one inlet air passage in communication with said chamber and a liquid fuel inlet discharging into this passage; a throttle in said air inlet passage, the carburetor having a second air inlet passage that is in communication with the chamber and with the first air inlet passage between the liquid fuel inlet and the throttle; a second throttle disposed in the second air inlet passage and coupled with the first throttle to be operable in unison therewith; a valve controlling the communication between the second air inlet passage and said chamber; a thermostat in said chamber and operating, when responding to the heat within the chamber, to open said valve; and coupled air valves in the admission ends of said air inlet passages to control the amount of air flowing therethrough, and relatively disposed to enable the first air inlet passage to be slightly opened by its air valve while the second air inlet passage is substantially closed by its air valve.

2. The combination with an internal combustion engine having intake and exhaust conduits; of a conduit for air that is to be carbureted and placed in proximity to the exhaust conduit to be heated thereby; a chamber in communication with the air conduit to receive heated air therefrom; a carburetor having one inlet air passage in communication with said chamber and a liquid fuel inlet discharging into said passage; a throttle in said air inlet passage, the carburetor having a second air inlet passage that is in communication with the chamber and with the first air inlet passage between the liquid fuel inlet and the throttle; a second throttle, disposed in the second air inlet passage and coupled with the first throttle to be operable in unison therewith; a valve controlling the communication between the second air inlet passage and said chamber; a thermostat in said chamber and operating, when responding to the heat within the chamber, to open said valve; and coupled air valves in the admission ends of said air inlet passages to control the amount of air flowing therethrough.

3. The combination with an internal combustion engine having intake and exhaust conduits; of a conduit for air that is to be carbureted and placed in proximity to the exhaust conduit to be heated thereby; a chamber in communication with the air conduit to receive heated air therefrom; a carburetor having one inlet air passage in communication with said chamber and a liquid fuel inlet discharging into this passage; a throttle in said air inlet passage, the carburetor having a second air inlet passage that is in communication with the chamber and with the first air inlet passage between the liquid fuel inlet and the throttle; a second throttle, disposed in the second air inlet passage and coupled with the first throttle to be operable in unison therewith; a valve controlling the communication between the second air inlet passage and said chamber; and a thermostat in said chamber and operating, when responding to the heat within the chamber, to open said valve.

4. The combination with an internal combustion engine having intake and exhaust conduits; of a conduit for air that is to be carbureted and placed in proximity to the exhaust conduit to be heated thereby; a chamber in communication with the air conduit to receive heated air therefrom; a carburetor having one inlet air passage in communication with said chamber and a liquid fuel inlet discharging into this passage; a throttle in said air inlet passage, the carburetor having a second air inlet passage that is in communication with the chamber and with the first air inlet passage between the liquid fuel inlet and the throttle; a second throttle, disposed in the second air inlet passage and coupled with the first throttle to be operable in unison therewith; a valve controlling the communication between the second air inlet passage and said chamber; and means for operating said valve.

5. The combination with an internal combustion engine; of a carburetor having one inlet air passage and a liquid fuel inlet discharging into this passage; a throttle in said air inlet passage, the carburetor having a second air inlet passage that is in communication with the first between the liquid fuel inlet and the throttle; a second throttle, disposed in the second air inlet passage and coupled with the first throttle to be operable in unison therewith; a valve, uninfluenced by engine suction, that controls the passage of air into the second air inlet passage; a thermostat subject to the heat of the engine and serving, when responding to the heat, to open said valve; and coupled air valves in the admission ends of said air inlet passages to control the amount of air flowing therethrough, and relatively disposed to enable the first air inlet passage to be slightly opened by its air valve while the second air inlet passage is substantially closed by its air valve.

6. The combination with an internal combustion engine; of a carburetor having one discharging into said passage, the carburetor having a second air inlet passage that is in communication with the first between the liquid fuel inlet and the engine; a valve, uninfluenced by engine suction, that controls the passage of air into the second air inlet passage; a thermostat subject to the heat of the engine and serving, when responding to the heat, to open the valve; and coupled air valves in the admission ends of said air inlet passages to control the amount of air flowing therethrough.

15. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; a thermostat subject to the heat of the engine and serving, when responding to the heat, to open said valve; and coupled air valves in the admission ends of said air inlet passages to control the amount of air flowing therethrough, and relatively disposed to enable the first air inlet passage to be slightly opened by its air valve while the second air inlet passage is substantially closed by its air valve.

16. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; means for operating said valve; and coupled air valves in the admission ends of said air inlet passages to control the amount of air flowing therethrough, and relatively disposed to enable the first air inlet passage to be slightly opened by its air valve while the second air inlet passage is substantially closed by its air valve.

17. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; a thermostat subject to the heat of the engine and serving, when responding to the heat, to open said valve; and coupled air valves in the admission ends of said air inlet passages to control the amount of air flowing therethrough.

18. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; means for operating said valve; and coupled air valves in the admission ends of said air inlet passages to control the amount of air flowing therethrough.

19. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; a thermostat subject to the heat of the engine and serving, when responding to the heat, to open said valve; and coupled throttles, one in each air inlet passage.

20. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; means for operating said valve; and coupled throttles, one in each air inlet passage.

21. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; a thermostat subject to the heat of the engine and serving, when responding to the heat, to open said valve; and coupled throttles, one in each air inlet passage, the second air inlet passage having communication with the first between the throttle in the first air inlet passage and the fuel inlet.

22. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; means for operating said valve; and coupled throttles, one in each air inlet passage, the second air inlet passage having communication with the first between the throttle in the first air inlet passage and the fuel inlet.

23. The combination with an internal combustion engine; of a carburetor having one inlet air passage and a liquid fuel inlet discharging into this passage, the carburetor having a second air inlet passage that is in communication with the first between the liquid fuel inlet and the engine; a valve, uninfluenced by engine suction, that controls the passage of air into the second air inlet passage; a thermostat structure subject to the heat of the engine and serving, when responding to the heat, to open said valve, said carburetor including a third air passage communicating with the aforesaid air passage to control the temperature of the air flowing therein; and a valve, controlled by the thermostat structure, for opening the latter passage, when the thermostat structure has responded to the heat.

24. The combination with an internal combustion engine; of a carburetor having one inlet air passage and a liquid fuel inlet discharging into this passage, the carburetor having a second air inlet passage that is in communication with the first between the liquid fuel inlet and the engine; a valve that controls the passage of air into the second air inlet passage; a thermostat structure subject to the heat of the engine and serving, when responding to the heat, to open said valve, said carburetor including a third air passage communicating with the aforesaid air passage to control the temperature of the air flowing therein; and a valve, controlled by the thermostat structure, for opening the latter passage, when the thermostat structure has responded to the heat.

In witness whereof, I hereunto subscribe my name this 23rd day of September, A. D. 1922.

ROY O. HENSZEY.